(12) United States Patent
Kondo et al.

(10) Patent No.: US 6,241,192 B1
(45) Date of Patent: Jun. 5, 2001

(54) EARTH OBSERVATION METHOD, AND SYSTEM AND OBSERVATION SATELLITE, OPERATING GROUND SYSTEM AND PROGRAM FOR THE SAME

(75) Inventors: Hideji Kondo, Yokohama; Nobuo Hamano, Tokyo; Hiroshi Matsumura, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/409,653

(22) Filed: Oct. 1, 1999

(30) Foreign Application Priority Data

Oct. 5, 1998 (JP) .................................................. 10-282816

(51) Int. Cl.$^7$ ...................................................... B64G 1/00
(52) U.S. Cl. ...................................... 244/158 R; 244/164
(58) Field of Search ........................................... 244/158 R

(56) References Cited

U.S. PATENT DOCUMENTS 5,813,634 * 9/1998 Pizzicaroli et al. .................. 244/176

OTHER PUBLICATIONS

A:W.L. Larson et. al., Space Mission Analysis and Design, Second Edition, Microcosm Inc. pp. 144–151.

* cited by examiner

*Primary Examiner*—Peter M. Poon
*Assistant Examiner*—Kevin Jakel
(74) *Attorney, Agent, or Firm*—Sofer & Haroun, LLP

(57) ABSTRACT

An earth observation system capable of observing the earth globally and uniformly in a steady observation operation mode while observing a given district on the earth in a high-frequency observation operation mode, as occasion requires, includes a plurality of observation satellites each equipped with an orbit transfer facility, an observation data receiving system, an observation satellite operating ground system, an observation command facility such as anti-disaster task forces, institutes or the like. In the steady observation operation mode for observing globally the earth, M observation satellites are constellated on each of L sun-synchronized quasi-recurrent orbits each having a same altitude and a same inclination (where L and M represents natural numbers). In the high-frequency observation operation mode for observing a particular district on the earth, M satellites are constellated on each of L sun-synchronized recurrent orbits each having a nominal altitude of 561 km and a nominal inclination 97.6 degrees or alternatively a nominal altitude of 888.3 km and a nominal inclination of 98.8 degrees.

15 Claims, 8 Drawing Sheets

FIG. 6

| QUASI-RECURRENCE (SPACE POSITION ABOVE A SAME GROUND SPOT ON EQUATOR IS RESUMED AFTER N DAYS) | RECURRENCE (SPACE POSITION ABOVE A SAME GROUND SPOT ON EQUATOR IS RESUMED EVERY DAY) |
|---|---|
| 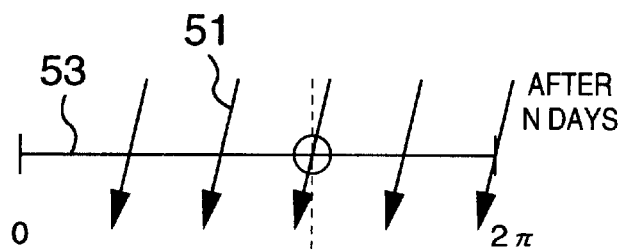 AFTER N DAYS | 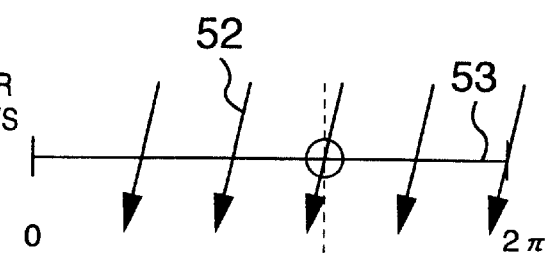 |
| 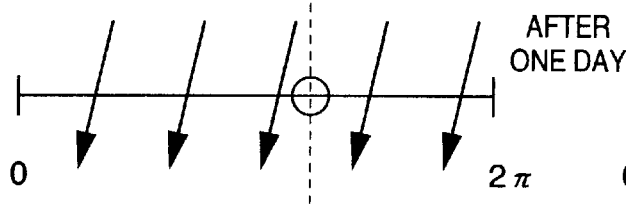 AFTER ONE DAY | |
| 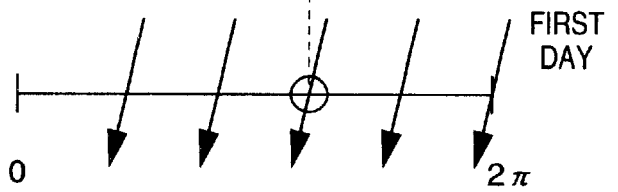 FIRST DAY | |
| DISASTER AREA | DISASTER AREA |
| ONE REVOLUTION AROUND THE EARTH ABOVE EQUATOR | ONE REVOLUTION AROUND THE EARTH ABOVE EQUATOR |
| QUASI-RECURRENT ORBIT | RECURRENT ORBIT |
| STEADY OBSERVATION OPERATION MODE (CAPABLE OF OBSERVING THE EARTH OVER WHOLE SURFACE THEREOF) | HIGH-FREQUENCY OBSERVATION OPERATION MODE (CAPABLE OF PERFORMING REPETITIVE OBSERVATION OF DISASTER AREA) |

(IN VIEWING THE EARTH FROM ABOVE THE NORTH POLE)

EARTH OBSERVATION METHOD, AND SYSTEM AND OBSERVATION SATELLITE, OPERATING GROUND SYSTEM AND PROGRAM FOR THE SAME

BACKGROUND OF THE INVENTION

The present invention relates generally to an earth observation system for observing the earth by operating a plurality of observation satellites. More particularly, the present invention is concerned with an earth observation system for operating the observation satellites ordinarily in a steady observation operation mode for observing globally the earth over the whole surface thereof while operating the satellites in a high-frequency observation operation mode for observing a given or particular district or local area on the earth with an increased observation frequency when occasion requires. Furthermore, the invention concerns a structure of the observation satellite, a sensor system for earth observation, an observation satellite operating ground system, and a data receiving system for the earth observation system. Moreover, the present invention also relates to an earth observation method and a program for allowing the observation method to be executed with the aid of a computer.

In the conventional earth observation system known heretofore, a single observation satellite is operated on and along a predetermined sun-synchronized quasi-recurrent orbit, wherein the number of days of a recurring period of the orbit, i.e., the number of days taken for the observation satellite to be able to observe again a same spot on the earth, is constant. The frequency of observation for a single given spot on the earth is in a range of once per several days to once per several weeks.

Thus, with the conventional earth observation system in which one observation satellite is operated on and along the predetermined orbit, it is certainly possible to observe globally and substantially uniformly the earth over the whole surface thereof. However, realization of the recursive observation of a given area or district on the earth will take a time interval as long as several days or several weeks. Thus, with the conventional observation satellite, it is impossible to effectuate a high-frequency observation of a given or particular district on the earth by maneuvering the satellite in a high-frequency observation operation mode which is of course favorable for observing a phenomenon, event or the like such as, for example, disaster occurring at a given or particular district on the earth.

Furthermore, even with the observation satellite equipped with an orbit control facility, correction of the orbit is possible only in conjunction with either the sun-synchronized quasi-recurrent orbit or the sun-synchronized recurrent orbit. To say in another way, any approaches or attempts for operating the satellite through combination of the sun-synchronized quasi-recurrent orbit and the sun-synchronized recurrent orbit have not yet been reported.

SUMMARY OF THE INVENTION

In the light of the state of the art described above, it is an object of the present invention to provide an earth observation system which makes it possible to operate the observation satellite selectively not only on and along the recurrent orbit but also on the quasi-recurrent orbit through orbit transfer, for thereby allowing the observation satellite to be operated in a steady observation operation mode for observing globally and substantially uniformly the earth over the whole surface thereof or in a high-frequency observation operation mode for observing concentratively a given or particular district with an enhanced observation frequency as occasion requires, in contrast to the conventional earth observation system where only one predetermined operation orbit is made available for each satellite.

In view of the above and other objects which will become apparent as the description proceeds, the earth observation system taught by the present invention includes a plurality of observation satellites each imparted with an orbit transfer facility, wherein in a steady observation operation mode, the observation satellites are operated on the quasi-recurrent orbits, respectively, while when a high-frequency observation operation mode in which observation for a given or particular district on the earth is performed at an increased frequency becomes necessary as occasion requires, appropriate ones of the observation satellites are transferred to the recurrent orbits for operation of the satellites on these recurrent orbits, respectively. Further, the present invention teaches that in the steady observation operation mode, the observation satellites are operated on and along sun-synchronized quasi-recurrent orbits (described in detail later on) while in the high-frequency observation operation mode for observation of a particular district or area on the earth, the observation satellites are operated on and along sun-synchronized recurrent orbits (also described in detail later on), by realizing the transfer of the satellites between the two types of orbits mentioned above through maneuver incurring less energy consumption.

Thus, according to a general aspect of the present invention, there is provided an earth observation system which includes a plurality of observation satellites each equipped with an orbit transfer facility, and an observation satellite operating ground system for performing control for maintaining orbits for the observation satellites, respectively, or for changing or transferring the orbits for the observation satellites, wherein in a steady observation operation mode, the observation satellites are operated on a plurality of quasi-recurrent orbits, respectively, for performing observation of the earth, while when a high-frequency observation operation mode where observation for a particular district on the earth is carried out at an increased frequency is required, appropriate ones of the observation satellites are transferred to recurrent orbits so that the particular district can be observed with the transferred observation satellites at an increased frequency, and wherein when the high-frequency observation operation mode becomes no more necessary, the satellites transferred to the recurrent orbits are again transferred back to the original quasi-recurrent orbits, respectively.

In a mode for carrying out the invention, it is preferred that in the steady observation operation mode of the earth observation system described above, the plurality of observation satellites are constellated for operation on a plurality of sun-synchronized quasi-recurrent orbits, respectively, which have a same altitude and a same inclination and which differ from one another in respect to the right ascension of ascending node, while in the high-frequency observation operation mode, the given observation satellites are transferred, respectively, to a plurality of sun-synchronized recurrent orbits each having a nominal altitude of 561 km and a nominal inclination of 97.6 degrees or alternatively to a plurality of sun-synchronized recurrent orbits each having a nominal altitude of 888.3 km and a nominal inclination of 98.9 degrees, to thereby operate all of the observation satellites transferred to the sun-synchronized recurrent orbits with such constellation that the particular district on the earth can be observed with all of the orbit-transferred observation satellites.

In another mode for carrying out the invention, it is preferred that in the earth observation system described above, each of the observation satellites is equipped with an earth observation sensor, wherein with regard to the operational orbits of the observation satellites in the steady observation operation mode, values of altitude and inclination of the operational orbits are, respectively, in proximity to values of altitude and inclination of the observation orbits in the high-frequency observation operation mode for observing a particular district on the earth, and wherein the observation sensor has an appropriate swath width so that global observation of the earth over the whole surface thereof can be carried out in the steady observation operation mode within a number of days of a recurring period or within a number of revolutions in a recurring period.

Further, according to another aspect of the present invention, there is provided an observation satellite which can be employed in the earth observation system described above and which includes a communication unit for receiving a control command concerning an orbit transfer quantity as sent from an observation satellite operating ground system, a data processing unit for arithmetically determining control quantities, and a control unit for controlling attitude of the observation satellite and an orbit thereof, whereby the orbital elements of the sun-synchronized quasi-recurrent orbit or those of the sun-synchronized recurrent orbit are maintained during a period demanded.

Additionally, according to yet another aspect of the present invention, there is provided an observation satellite which can be employed in the earth observation system described above and which includes an observation sensor having an appropriate swath width, a communication unit for receiving a control command concerning an orbit transfer quantity as sent from an observation satellite operating ground system, a data processing unit for arithmetically determining control quantities, and a control unit for controlling a pointing direction of the observation sensor as well as attitude of the observation satellite and the orbit thereof, whereby the orbital elements of the sun-synchronized quasi-recurrent orbit or alternatively those of the sun-synchronized recurrent orbit are maintained during a period demanded.

According to still another aspect of the present invention, there is provided an observation satellite which can be employed in the earth observation system described previously and which includes an observation sensor having an appropriate swath width, a communication unit for receiving a control command sent from an observation satellite operating ground system, a data processing unit for arithmetically determining control quantities, and a control unit for controlling a pointing direction of the observation sensor as well as attitude of the observation satellite and the orbit thereof, wherein the observation sensor can be oriented in a direction pointing to the earth for observation thereof either on the sun-synchronized quasi-recurrent orbit or on the sun-synchronized recurrent orbit in accordance with an operation command.

In a mode for carrying out the invention, it is preferred that in the observation satellite described above, the orientation of the observation sensor in the direction pointing to the earth is realized by controlling a pointing direction of the sensor or by controlling an attitude of the observation satellite.

Additionally, according to a further aspect of the present invention, there is provided an earth observing sensor system mounted on an observation satellite which constitutes a part of the earth observation system described previously, which sensor system can observe the earth with a demanded accuracy by driving the sensor with a sensor orientation control unit in accordance with a control quantity command value supplied from a data processing subsystem regardless whether the observation satellite is on a sun-synchronized quasi-recurrent orbit or on a sun-synchronized recurrent orbit or in the course of being transferred from one of the above-mentioned orbits to the other.

According to a yet further aspect of the present invention, there is provided an observation satellite operating ground system for performing controls for maintaining or transferring orbits of observation satellites constituting the earth observation system described previously, which ground system includes a transmission/reception subsystem for receiving a telemetry signal carrying data indicating states of the observation satellite and a ranging signal for measuring a range to the satellite from a ground station while transmitting satellite control commands, a ranging subsystem for processing the ranging signal to thereby determine arithmetically the range from the ground to the satellite and a range rate, an orbit determination program module for arithmetically determining six elements of the orbit of the observation satellite on the basis of the range and the range rate, and a satellite control command generation program module for arithmetically determining control quantities for the orbit and attitude of the observation satellite, wherein orbit control quantities for the orbit of at least one observation satellite operating currently and for orbital transfer of the observation satellite to an orbit as required are arithmetically determined, to thereby generate control commands for these control quantities for transmission thereof to the above-mentioned observation satellite.

According to a yet further aspect of the present invention, there is provided an observation data receiving system for receiving data acquired through observation by the observation satellites constituting pats of the earth observation system described hereinbefore. The observation data receiving system includes a signal receiving unit for receiving data of observation transmitted from at least one observation satellite operating currently, a recording unit for recording the observation data, a program module for generating an antenna control command for controlling a pointing direction of an antenna of the observation data receiving system on the basis of power level of a received signal derived from output of the signal receiving unit so that the antenna points to the satellite mentioned above, and a driving unit for driving an antenna control actuator in accordance with the antenna control command.

By virtue of such arrangement of the earth observation system that a plurality of observation satellites each equipped with an orbit transfer facility are operated on and along the quasi-recurrent orbits, respectively, in the steady observation operation mode, while when the high-frequency observation operation mode becomes necessary, as occasion requires, appropriate ones of the satellites are transferred to the recurrent orbits at appropriate time points, respectively, the high-frequency observation can be realized for a given or particular district on the earth by taking advantage of the fact that the observation satellite operating on and along the recurrent orbit is capable of performing observation once a day for a given district on the earth located on or in the vicinity of a track swept by the satellite traveling on and along the recurrent orbit mentioned above.

In a preferred mode for carrying out the present invention, the earth observation system can be implemented as a global monitoring system which includes twenty-four observation satellites, wherein in the steady observation operation mode, these satellites are operated on a one-by-one basis in twenty-four orbital planes of the sun-synchronized quasi-recurrent orbits which have a same altitude and a same inclination, respectively, and which differ one another in respect to the right ascension of ascending node, while in the high-frequency observation operation mode for observing a given or particular district or area on the earth, the observation satellites are operated on and along the twenty-four sun-synchronized recurrent orbits which have a same altitude and a same inclination, respectively, and which differ from one another in respect to the right ascension of ascending node. The global monitoring system of the arrangement described above can find useful application to a system for monitoring environmental conditions at concerned districts on the earth as well as the statuses of concerned phenomena or events such as disaster occurring locally on the earth, to a great advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 6 is a view for graphically illustrating features of a recurrent orbit and a quasi-recurrent orbit;

DESCRIPTION OF THE EMBODIMENTS

The present invention will be described in detail in conjunction with what is presently considered as preferred or typical embodiments thereof by reference to the drawings.

Figure 1:
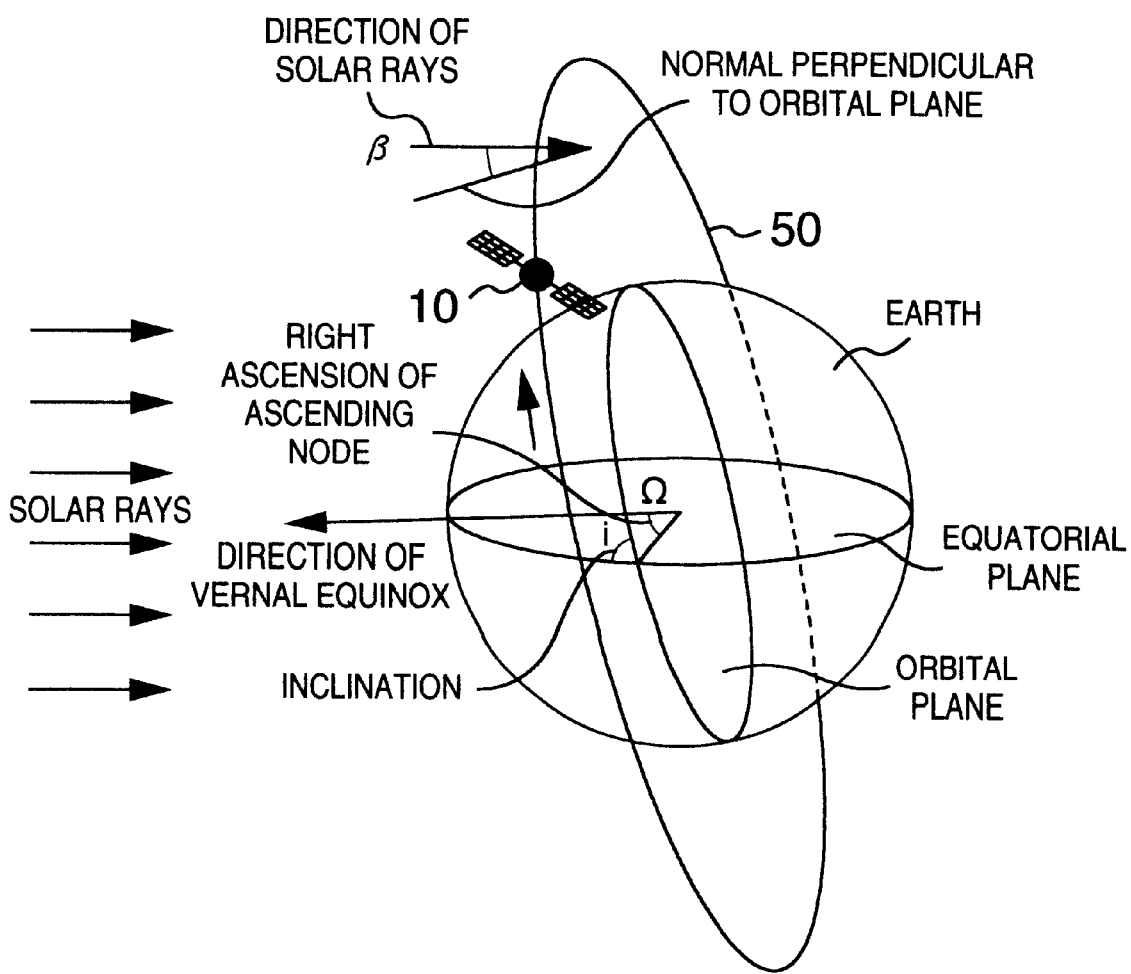
FIG. 1 is a view for illustrating an orbital system (one observation satellite) in a global earth (environment/disaster) monitoring system.

Referring to FIG. 1, reference numeral 10 denotes an observation satellite and numeral 50 denotes an operational orbit therefor. Inpractical applications, it is to be understood that 24 operational orbit planes which have a same altitude and a same inclination and which differ in respect to the right ascension of ascending node are provided for a corresponding number of observation satellites, respectively, even though only one satellite and only one orbit therefor are shown in FIG. 1 for simplification of the illustration.

It is presumed that the orbit 50 mentioned above is a sun-synchronous orbit (also known as the sun-synchronized orbit). With the term "sun-synchronous orbit", such an orbit of the observation satellite is meant that an angle formed between the direction of the solar rays and a normal line perpendicular to an orbital plane of the orbit of the observation satellite can be maintained constantly at a predetermined angle $\beta$, as illustrated in FIG. 1, or to say in another way, such an earth-ground orbit of the satellite that the satellite is always in the same direction relative to that of the sun, as a result of which the satellite passes over the earth equator at a same spot at same times. Thus, on the sun-synchronous orbit, the local civil time of the satellite can always remain constant, allowing thus earth observation to be performed under the same solar radiation condition. Besides, the sun-synchronous orbit is very convenient for power control of the satellite. For these reasons, the sun-synchronous orbit is ordinarily made use of for the earth observation. Incidentally, the inclination i of the sun-synchronous orbit is 100 degrees or so. As typical ones of the satellites launched onto the sun-synchronous orbit in Japan, there can be mentioned the Marine Observation Satellite-1 (or MOS-1 in short) and the Japanese Earth Resources Satellite-1 (or JERS-1 in short).

Figure 2:
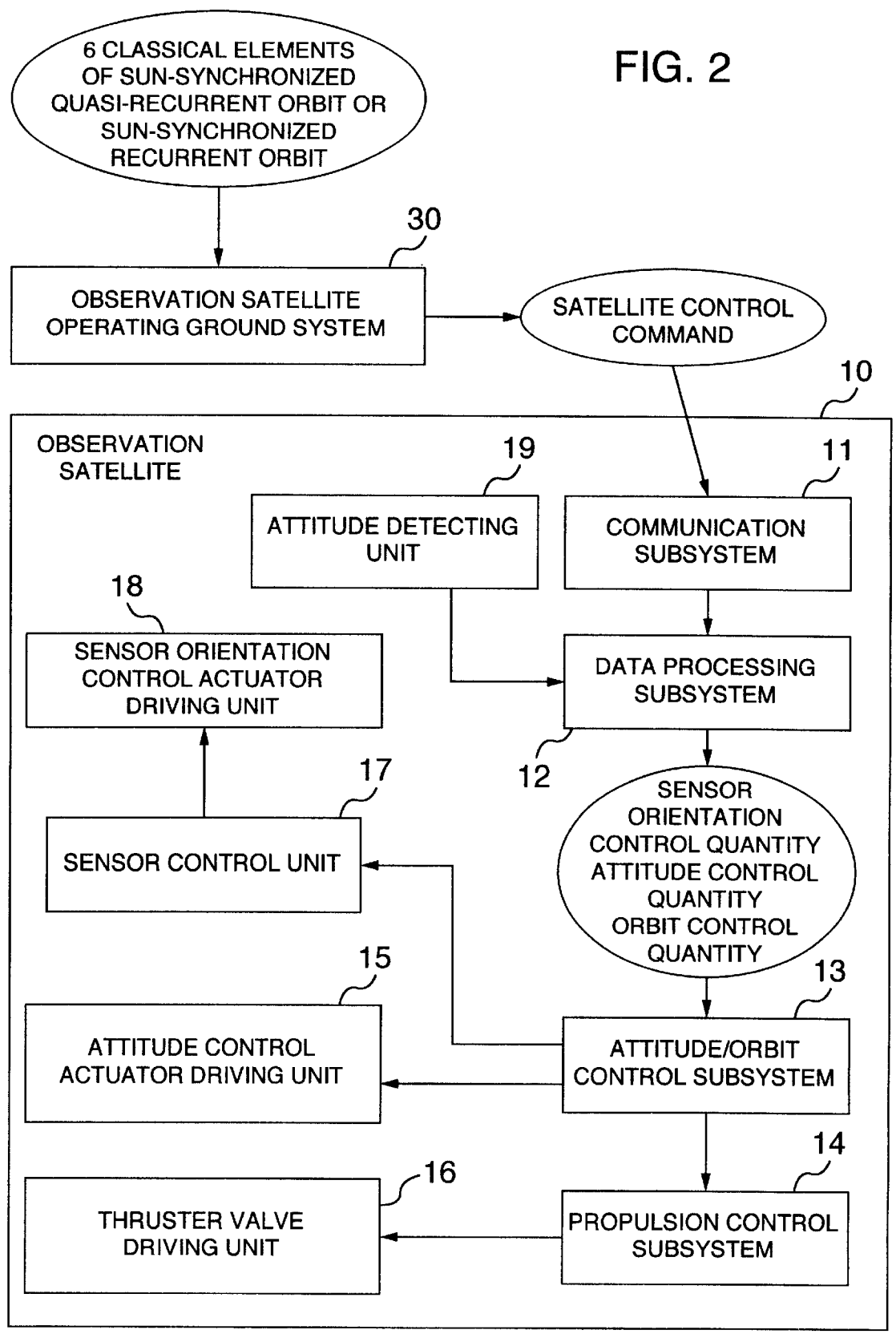
FIG. 2 is a block diagram showing generally and schematically a structure of an observation satellite according to an embodiment of the present invention.

FIG. 2 is a view showing generally and schematically a structure of the observation satellite according to an embodiment of the present invention. Referring to the figure, the observation satellite 10 is comprised of a communication subsystem 11 for receiving control commands sent from an observation satellite operating ground system 30 installed on the ground, a data processing subsystem 12 for processing signals received through the communication subsystem 11, an attitude/orbit control subsystem 13 for outputting signals for controlling the attitude and the orbit of the observation satellite, a propulsion control subsystem 14 for outputting a signal for controlling the orbit, an actuator driving unit 15 for performing the attitude control of the satellite by controlling e.g. the angular velocity of a momentum wheel or wheels on the basis of the signal outputted from the attitude/orbit control subsystem 13, a thruster valve driving unit 16 for performing the orbit control by controlling a predetermined thruster or thrusters on the basis of the signal outputted from the propulsion control subsystem 14, a sensor control unit 17 for supplying a signal for controlling the pointing direction of an earth observation sensor on the basis of the signal outputted from the attitude/orbit control subsystem 13, a sensor orientation control actuator driving unit 18 for performing orientation control (pointing direction control) of the sensor on the basis of the signal outputted from the sensor control unit 17, and an attitude detecting unit 19 for detecting an attitude of the observation satellite 10.

The attitude detecting unit 19 may be implemented by using a gyroscope, a star sensor, a sun sensor, an earth sensor or the like.

With the structure of the observation satellite 10 described above, orbital elements of the sun-synchronized quasi-recurrent orbit or those of the sun-synchronized recurrent orbit can be maintained throughout a mission period as demanded by operating appropriately the structural components mentioned above.

Furthermore, in the observation satellite 10 of the structure described above, orientation of the earth observation sensor can be so controlled that the sensor is directed or points to the earth dependently on the mission as demanded on either one of the sun-synchronized quasi-recurrent orbit and the sun-synchronized recurrent orbit. This control can be accomplished by controlling the attitude of the observation satellite 10 itself through the medium of the actuator driving unit 15 or alternatively by controlling the orientation of the earth observation sensor through the medium of the sensor orientation control actuator driving unit 18.

Figure 3:
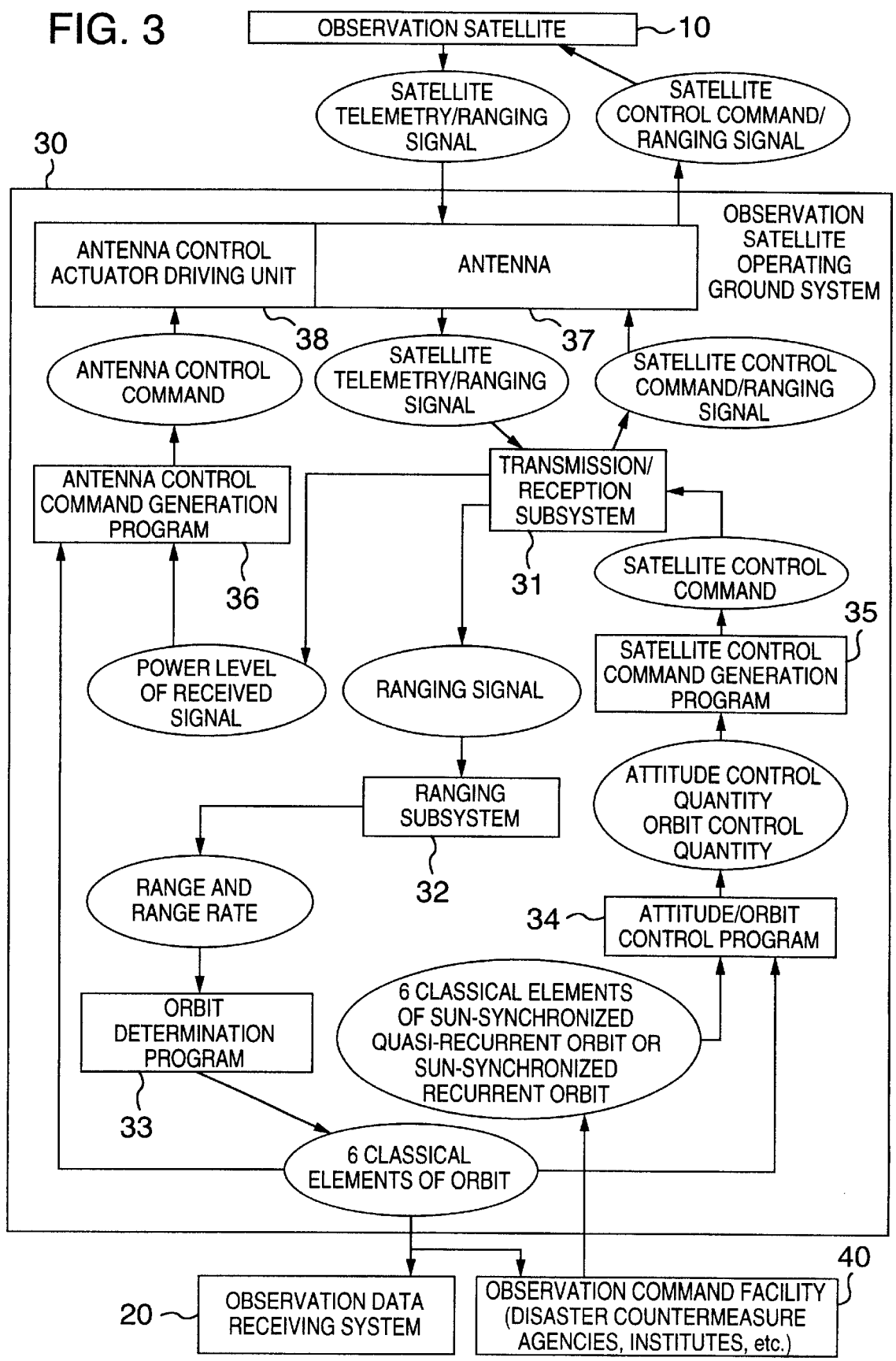
FIG. 3 is a block diagram showing generally and schematically a structure of an observation satellite operating ground system according to an embodiment of the present invention.

FIG. 3 is a view showing generally and schematically a structure of the observation satellite operating ground system according to an embodiment of the present invention. As can be seen in the figure, the observation satellite operating ground system 30 is comprised of a transmission/reception subsystem 31 for transmitting a command signal and a ranging signal while receiving a telemetry signal and the ranging signal, a ranging subsystem 32 for processing the ranging signal outputted from the transmission/reception subsystem 31 to thereby calculate the range to the satellite and the range rate, an orbit determination program module 33 for arithmetically determining 6 orbital elements or (i.e., argument of perigee, inclination, right ascension of ascending node, true anomaly, semi-major axis and eccentricity) of the orbit of the satellite on the basis of the ranging signal and the range rate signal outputted from the ranging subsystem 32, an attitude/orbit control program module 34 for arithmetically determining the attitude control quantity and the orbit control quantity on the basis of the 6 elements of the orbit of the sun-synchronized quasi-recurrent orbit or the sun-synchronized recurrent orbit and the 6 elements of the orbit determined arithmetically by the orbit determination program module 33, a satellite control command generation program module 35 for generating a satellite control command on the basis of the attitude control quantity and the orbit control quantity, and an antenna control command generation program module 36 for generating an antenna control command for controlling the pointing direction of the antenna 37 on the basis of the intensity received signal power level which is derived from the signal sent from the satellite and received through the transmission/reception subsystem 31 and the 6 elements of the orbit of the satellite.

The observation satellite operating ground system 30 is equipped with the antenna 37 for transmission/reception of the signals to/from the observation satellite 10 and an antenna control actuator driving unit 38 for driving the antenna for controlling the orientation thereof.

Figure 4:
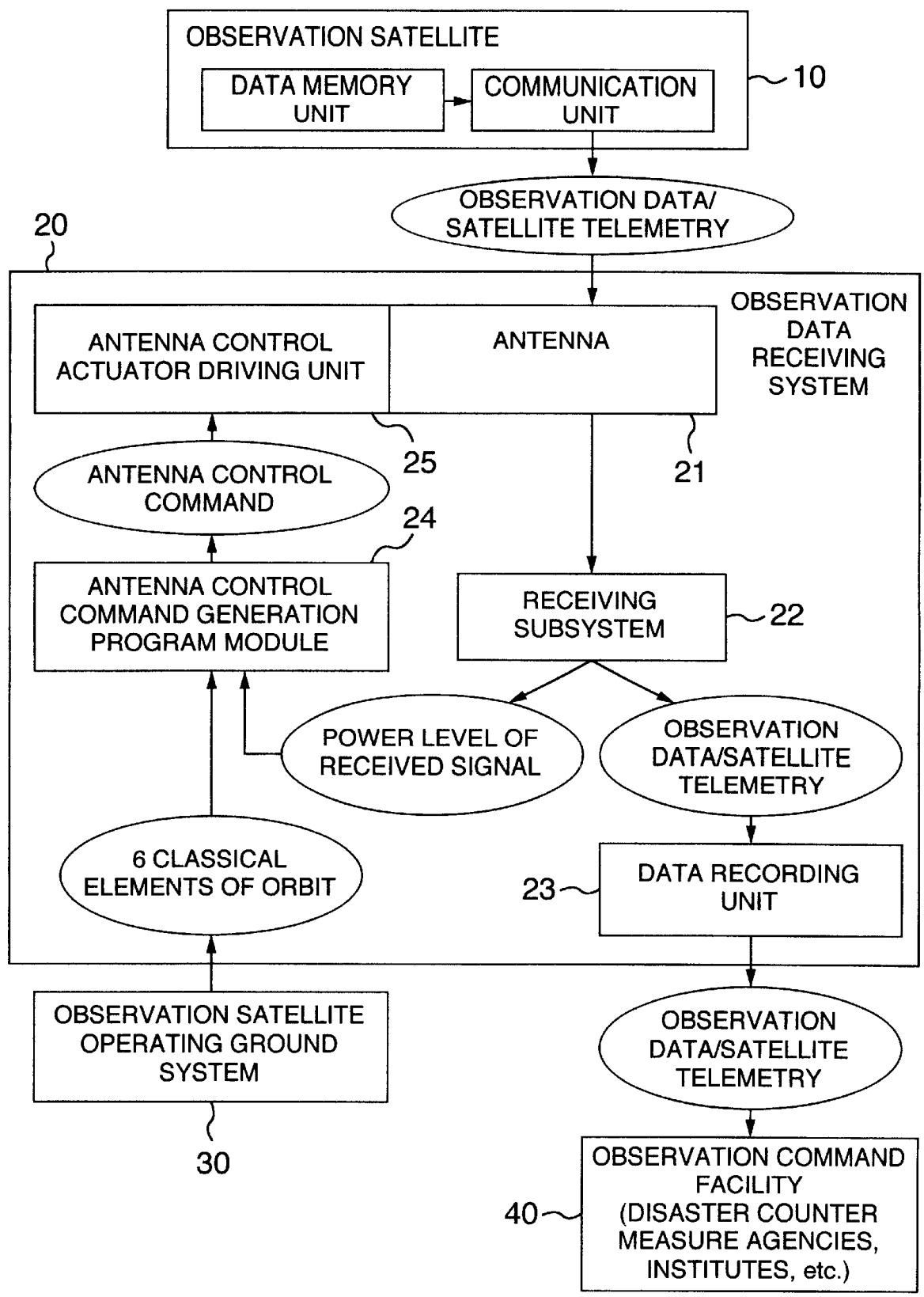
FIG. 4 is a block diagram showing schematically a structure of an observation data receiving system according to an embodiment of the present invention.

FIG. 4 shows a structure of an observation data receiving system according to an embodiment of the present invention. Referring to the figure, the observation data receiving system 20 is comprised of an antenna 21 and a receiving subsystem 22 for receiving observation data signals sent from the observation satellite, a recording unit 23 for recording the observation data, an antenna control command generation program module 24 for generating an antenna control command for directing the antenna to the satellite on the basis of the intensity or power level of the received signal measured by the receiving subsystem 22 and the 6 elements of the orbit of the relevant satellite, and an antenna control actuator driving unit 25 for orienting the antenna in the direction pointing to the satellite.

Figure 5:
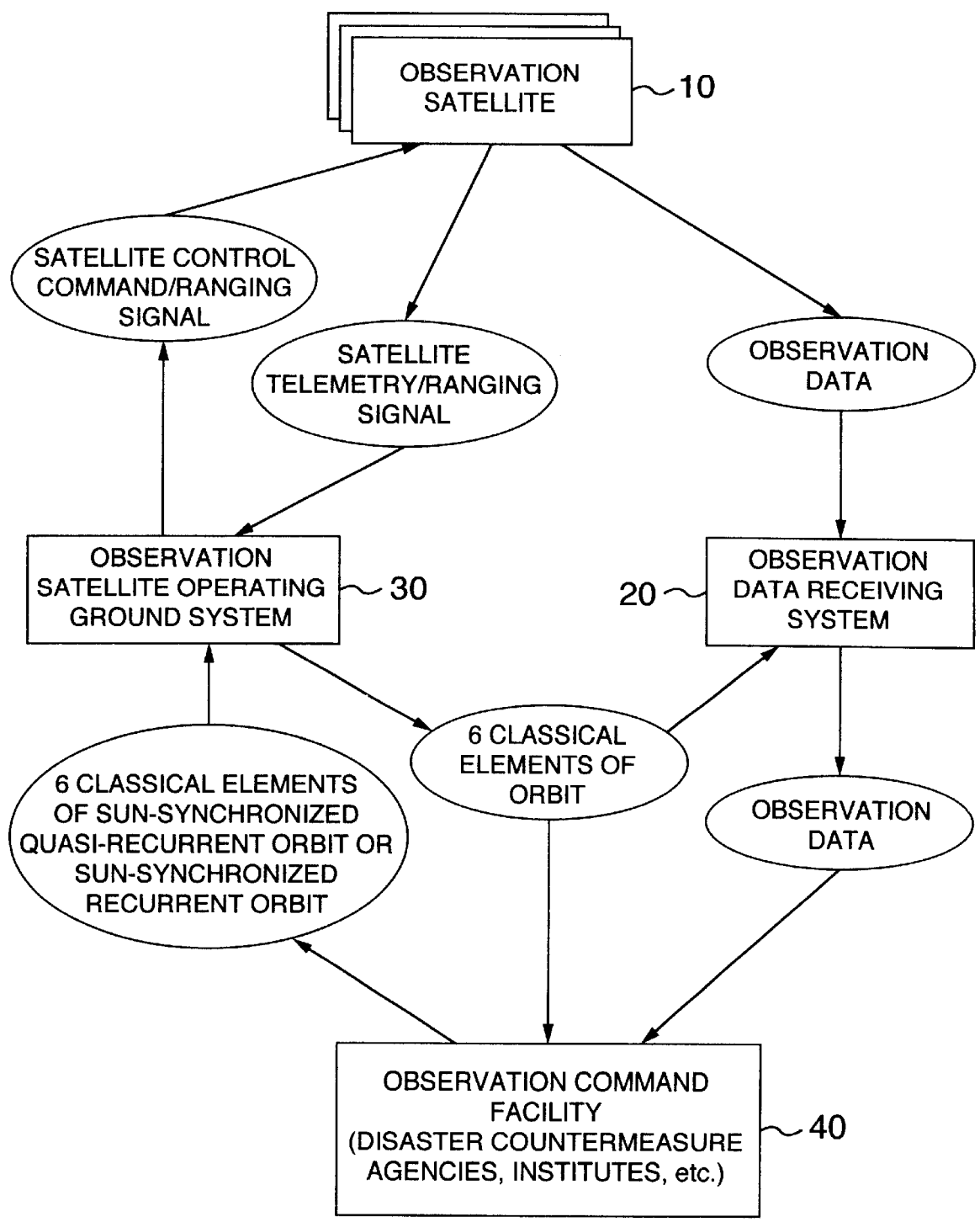
FIG. 5 is a block diagram for illustrating as a whole a system configuration of the earth monitor or observation system according to an embodiment of the present invention.

An earth observation system according to an embodiment of the invention is constituted by the observation satellite 10, the observation data receiving system 20, the observation satellite operating ground system 30 and observation command facility 40 described above in such a system configuration as illustrated in FIG. 5.

More specifically, the observation satellite operating ground system 30 is so arranged as to send the satellite control command/ranging signals to the observation satellite 10 and receive the satellite telemetry/ranging signals from the observation satellite 10 for thereby determining arithmetically the 6 elements of the orbit of the observation satellite 10, the results of which are supplied to the observation data receiving system 20 and the observation command facility 40.

The observation data receiving system 20 in turn controls the receiving antenna on the basis of the 6 elements of the orbit for thereby receiving the observation data from the satellite 10, which data are then supplied to the observation command facility 40.

On the other hand, the observation command facility 40 is so arranged as to determine arithmetically the 6 elements of the orbit of the sun-synchronized quasi-recurrent orbit or the sun-synchronized recurrent orbit on the basis of the 6 elements of the orbit and the observation data while making decision as to which of the sun-synchronized quasi-recurrent orbit and the sun-synchronized recurrent orbit is to be selected, as a result of which the 6 elements of the orbit of either the sun-synchronized quasi-recurrent orbit or the sun-synchronized recurrent orbit are supplied to the observation satellite operating ground system 30.

In response, the observation satellite operating ground system 30 transfers the observation satellite 10 to the sun-synchronized quasi-recurrent orbit or the sun-synchronized recurrent orbit on the basis of the 6 elements of the sun-synchronized quasi-recurrent orbit or those of the sun-synchronized recurrent orbit.

With regards to the recurrence of the orbit of the observation satellite 10, the orbit can be classified in the recurrent orbit and the quasi-recurrent orbit, as illustrated in FIG. 6. More specifically, FIG. 6 illustrates in what manner the ground tracks of the individual observation satellites traveling on and along the recurrent orbits 52 or the quasi-recurrent orbits 51 pass over the earth equator during one day, wherein the period of one revolution of the satellite above and around the earth equator is represented by a numerical value line 53.

In this conjunction, the term "recurrent orbit", means such orbit that the ground track of the observation satellite returns to a same spot on the earth equator upon every lapse of one day, as is illustrated at the right-hand side in FIG. 6. Thus, with the recurrent orbit, observation of a given or particular district can be realized at a higher frequency although the area for observation is limited remarkably. On the other hand, the term "quasi-recurrent orbit" means such orbit that the ground track of the observation satellite returns to the same spot on the earth equator upon every lapse of N days (N≧2), as is illustrated at the left-hand side in FIG. 6. Thus, with the quasi-recurrent orbit, global observation over the whole earth area can be carried out by selecting appropriately the value of N with the swath width of the sensor taken into consideration, although the high-frequency observation of a particular district mentioned above can not be realized.

As is apparent from the above, for monitoring of the environment of the earth and phenomena or events such as disasters occurring on the earth, it is preferred that the sun-synchronized quasi-recurrent orbit which represents the sun-synchronous orbit and at the same time the quasi-recurrent orbit be used for performing the global environment monitoring at a predetermined frequency, while upon occurrence of disaster, it is preferred that the sun-synchronized recurrent orbit which represents the sun-synchronous orbit and at the same time the recurrent orbit be employed for performing the observation of a concerned district such as disaster-stricken area at a higher frequency. For convenience of the description, the former is referred to as the steady observation operation mode, while the latter is referred to as the high-frequency observation operation mode.

In general, when the altitude of the satellite traveling on and along the observation orbit exceeds 1000 km, the amount of radiation rays increases, whereby load imposed on the payload equipment is caused to increase correspondingly, while the range between the observation satellite and the ground surface of the earth increases as well, which incurs lowering of the ground resolution in the observation. On the other hand, when the range mentioned above is shorter than 500 km, the altitude of the observation satellite will decrease steeply under the influence of the aerodynamic drag, as a result of which the mission life of the observation satellite will be shortened.

For the reasons mentioned above, the altitude of 500 km to 1000 km is ordinarily adopted in the earth observation.

Under the circumstances, in the earth observation system according to the instant embodiment of the invention, the sun-synchronized recurrent orbit and the sun-synchronized quasi-recurrent orbit with the altitude of 500 km to 1000 km are adopted. The sun-synchronized recurrent orbit and the sun-synchronized quasi-recurrent orbit have to satisfy, respectively, the conditions mentioned below.

Condition 1: Condition for the Sun-synchronous Orbit $$-a^{\frac{7}{2}}(1-e)^2 = 2.0893 \times 10^{14} \cos i \quad (1)$$

where a represents a semi-major axis of the orbit (km), e represents the eccentricity, and i represents the inclination.

Condition 2: Condition for the Recurrent (Quasi-recurrent) Orbit $$\frac{N}{n} = \omega_e \frac{a^{\frac{3}{2}}}{\sqrt{\mu_e}} - \frac{3}{2} J_2 \frac{R_e^2}{a^2(1-e^2)^2} \cos i \quad (2)$$

(N=1 for the recurrent orbit)

where a represents a semi-major axis of the orbit (km), e represents the eccentricity, i represents the inclination, $R_e$ represents the radius of the earth, $\mu_e$ represents the gravitational constant, $\omega_e$ represents the earth rotation angular velocity, $J_2$ represents the earth gravitational potential, n represents the number of recurring period(s), and N represents the number of days of the recurring period.

Figure 7:
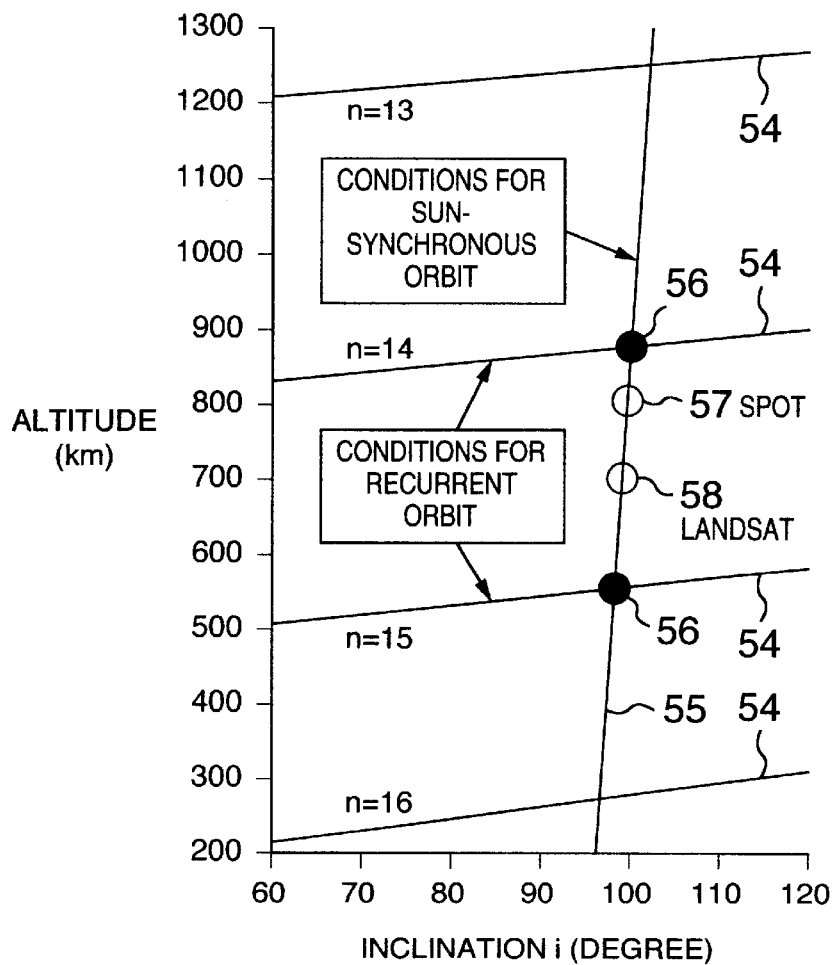
FIG. 7 is a view for graphically illustrating conditions for sun synchronization and conditions for recurrence (quasi-recurrence) adopted in the earth observation system according to the present invention.

Referring to FIG. 7, solution of the sun-synchronized recurrent orbit can be given by an intersecting node 56 between two graphic lines 54 and 53 representing the condition for the sun synchronization (expression (1)) and the condition for the recurrence, i.e., expression (2) where N=1.

On the other hand, nodes representing the solutions for the sun-synchronized quasi-recurrent orbit exist indefinitely at points on the straight line 55 representing the condition for the sun synchronization except for the node mentioned in the above paragraph. As the examples of the sun-synchronized quasi-recurrent orbit, there may be mentioned orbits of the existing satellites of the observation satellite series "LAND-SAT" of USA and Earth Observation System "SPOT (abbreviation of Systeme Probatoire d' Observation de laTerre) of France, as indicated by reference numerals 57 and 58, respectively, in FIG. 7.

As indicated by 56 in FIG. 7, in the altitude range of 500 km to 1000 km, the sun-synchronized recurrent orbit is limited to two orbits mentioned below:

Orbit #1 of 888.3 km in altitude and 98.9 degrees in inclination, and

Orbit #2 of 561.0 km in altitude and 97.6 degrees in inclination.

However, it is difficult in practice to maintain constantly the above-mentioned orbits accurately. Errors within a predetermined range are tolerable. Accordingly, the values mentioned above should be regarded as nominal values.

For the observation in details of an area where disaster is occurring (i.e., in the high-frequency observation operation mode), the space resolution is a very important factor. In this conjunction, higher space resolution can be realized as the altitude is lower with the satellite launching cost being suppressed. Thus, the orbit 2 of lower attitude should preferably be selected as the observation orbit in the high-frequency observation operation mode, e.g. for observation of the disaster area.

In order to suppress the amount of a propellant forth orbit transfer to a minimum, the mission altitude in the steady observation operation mode and the mission altitude in the high-frequency observation operation mode (e.g. for observation of the disaster area) should preferably be closer to each other. Accordingly, the altitude in the steady observation operation mode is selected to be ca. 561 km.

In general, the number of revolutions (number of revolutions in the recurring period) which is required for covering a whole district or area destined for observation differs in dependence on the swath width of the sensor. More specifically, the number of revolutions increases as the swath width is narrower. As the sensor to be carried by the observation satellite constituting a part of the earth observation system according to the instant embodiment of the invention, there are conceivable the synthetic aperture radar (or SAR in short) mounted on the satellite "JERS-1", the high-resolution visible and infrared sensor (or HRVIR in short) which is scheduled to be mounted on the satellite "SPOT-5", and the advanced microwave sounding unit (or AMSU in short) scheduled to be mounted on the satellite of the earth observation system (or EOS in short) of USA. Of the sensors mentioned above, the sensor of which swath width is narrowest is the sensor SAR of the satellite "JERS-1". In more concrete, the swath width of this sensor on the earth surface is on the order of 75 km at the altitude of ca. 570 km. In this conjunction, with the sensor swath width of ca. 75 km mentioned above, 615 revolutions of the satellite will be required on the presumption that among the ground tracks swept after the time lapse corresponding to the number of days in one recurring period, the overlap margin of the swath width between the adjacent ground tracks is ca. 10 km, since then the length of the earth equator must be divided by the swath width from which the overlap margin has been subtracted.

As the sun-synchronized quasi-recurrent orbits which can satisfy the expressions (1) and (2) mentioned previously and whose number of revolutions in the recurring period is ca. 615 at the altitude of ca. 561 km, there are two orbits mentioned below. Orbit #2-1 of 568 km in altitude, 97.6 degrees in inclination and 629 in number of revolutions in the recurring period (42 days in number of days of recurring period), and Orbit #2-2 of 553 km in altitude, 97.6 degrees in inclination and 616 in number of revolutions in the recurring period (41 days in number of days of recurring period).

At this juncture, the magnitudes of velocity incrementation ΔV which are required for the orbit transfer from the orbit candidates (orbit 2-1 and orbit 2-2) for the sun-synchronized quasi-recurrent orbit in the steady observation operation mode to the orbit in the high-frequency observation operation mode (i.e., the sun-synchronized recurrent orbit of 561 km in altitude and 97.6 degrees in inclination) will arithmetically be determined. Because substantially no difference makes appearance in the inclination before and after the orbit transfer, it is presumed that the Hohmann transfer is adopted as the orbit transfer method.

Figure 8:
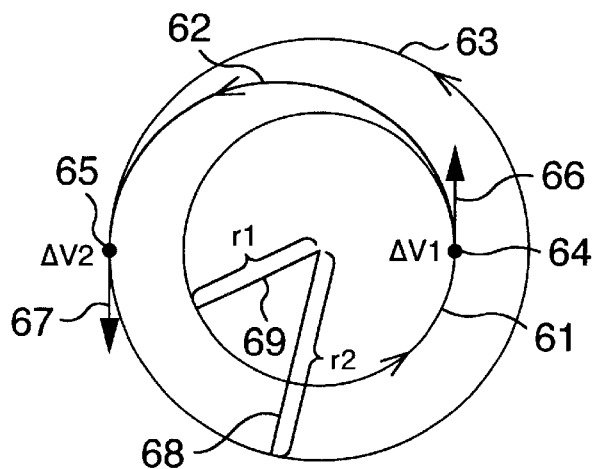
FIG. 8 is a schematic diagram for illustrating an orbit transfer resorting to the Hohmann transfer.

FIG. 8 is a schematic diagram for illustrating the orbit transfer based on the Hohmann transfer. In FIG. 8, there are illustrated an observation orbit 61 in the steady observation operation mode, a Hohmann transfer orbit 62 for the orbit transfer and an observation orbit 63 in the high-frequency observation operation mode (e.g. for observation of a disaster area).

At this juncture, it should however be understood that the orbit transfer method adopted in the earth observation system according to the present invention is never restricted to the Hohmann transfer method but other orbit transfer methods may equally be adopted.

The Hohmann transfer is minimum-energy orbit transfer procedure between coplanar concentric-circular orbits having a radius ratio smaller than 11.8. As is illustrated in FIG. 8, with the Hohmann scheme, the satellite transfer from the observation orbit 61 of a radius r1 to the observation orbit 63 of a radius r2 can be realized with two burns and thus with minimum velocity incrementation ΔV. In this conjunction, the transfer orbit 62 is represented by an elliptic curve which contacts the orbits 61 and 63 at the perigee 64 and the apogee 65, respectively. Referring to FIG. 8, the magnitude of the velocity incrementation ΔV is a sum of magnitude 66 of the velocity incrementation ΔV1 and magnitude 67 of the velocity incrementation ΔV2 at a perigee 64 and an apogee 65, respectively, of the Hohmann transfer orbit 62.

Representing by $r_p$ the orbital radius 69 of the lower orbit r1 while representing by $r_a$ the orbital radius 68 of the higher orbit r2, there can be derived the expressions mentioned below.

$$\Delta V_1 = \frac{\sqrt{\mu}}{r_p}\left[\sqrt{\frac{2(r_a/r_p)}{1+(r_a/r_p)}} - 1\right] \quad (3)$$

$$\Delta V_2 = \sqrt{\frac{\mu}{r_a}}\left[1 - \sqrt{\frac{2}{1+(r_a/r_p)}}\right] \quad (4)$$

$$\Delta V = \Delta V_1 + \Delta V_2 \quad (5)$$

$$= \sqrt{\frac{\mu}{r_p}}\left[\sqrt{\frac{2(r_a/r_p)}{1+(r_a/r_p)}}\left(1-\frac{r_p}{r_a}\right) + \sqrt{\frac{r_p}{r_a}} - 1\right]$$

From the above-mentioned expressions (3), (4) and (5), there can be obtained for the orbit candidates now under consideration the results of computation as follows:

For the orbit #2-1, the velocity incrementation ΔV is 4 m/s and the time taken for the orbit transfer is 0.8 hrs.

For the orbit #2-2, the velocity incrementation ΔV is 4 m/s and the time taken for the orbit transfer is 0.8 hrs.

Because substantially no difference makes appearance between the orbit #2-1 and the orbit #2-2 in respect to the velocity incrementation ΔV and the time required for the orbit transfer, the orbit #2-2 having less number of days of the recurring period is selected. Parenthetically, it should however be mentioned that the present invention is not necessarily restricted to the orbit #2-2. Here, it should be mentioned that the orbit transfer can be realized with very small velocity incrementation ΔV because the observation orbit for the steady observation operation mode and the observation orbit for the high-frequency observation operation mode are close to each other.

It is conceived that upon transfer of the observation satellite from one to another orbit, deviation of the pointing direction of the earth observation sensor may take place due to attitude change of the satellite under the influence of acceleration as applied. In that case, there may arise such unwanted situation that the accuracy demanded for the earth observation can no more be sustained.

In this conjunction, it is however to be noted that the observation satellite 10 according to the instant embodiment of the invention is equipped with the attitude detecting unit 19 for detecting its own attitude. By virtue of this feature, it is possible to orient the earth observation sensor toward the earth with the accuracy as demanded by driving the sensor orientation control unit on the basis of the commanded control quantity sent from the data processing system regardless of whether the satellite is on the sun-synchronized quasi-recurrent orbit or the sun-synchronized recurrent orbit or in the course of being transferred from one to the other orbit. Thus, the desired accuracy can be ensured for the observation of the earth.

On the sun-synchronized recurrent orbit for the high-frequency observation operation mode (for observation, e.g. a disaster area), one satellite can naturally observe a given district on the ground track once for a civil day without fail. Accordingly, by providing twenty four observation orbital planes for every hour in terms of the local civil time of the ascending node and disposing one satellite in each of the orbital planes so that a particular district can be observed, observation frequency of one per hour (once for one hour) can be realized for a particular or given district.

Figure 9:
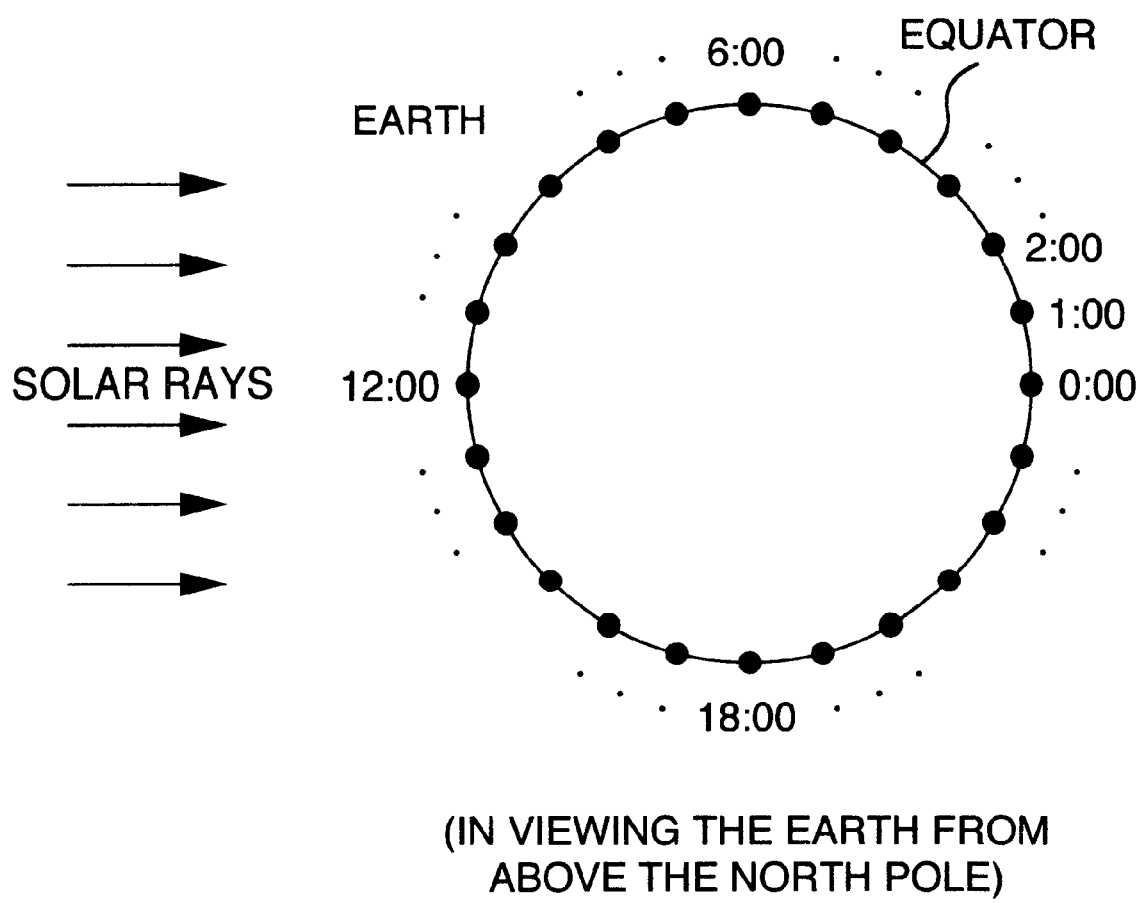
FIG. 9 is a view for illustrating intersections between the earth equator and the straight lines interconnecting the observation satellites and the center of the earth at local civil times of ascending node.

In this conjunction, the term "the local civil time of the ascending node" represents a time point at a spot on the earth where the ground track of the satellite traverses above the earth equator from the Southern Hemisphere of the earth to the Northern Hemisphere. Thus, viewing the earth equator circumference from above the north pole the point on the earth equator circumference farthest from the sun may be defined as "0:00" in terms of the local civil time of the ascending node, and starting from this time point "0:00", the time points "1:00" to "23:00" are defined equally in terms of the local civil time of the ascending node along the earth equator circumference in the clockwise direction on a one-by-one hour basis with one hour period corresponding to 15 degrees on the equator circumference, as can be seen in FIG. 9.

Now, description will be directed to a procedure for sending the orbit transfer command to given or selected satellites.

It is assumed, only by way of example, that disaster has occurred in a given area or district on the earth. In that case, the observation command facility will receive an satellite observation request together with geographical information of the disaster-stricken area from the agency resident in that area or a relevant countermeasure center.

Then, in the observation command facility, the time taken for sending the relevant commands to the selected satellites to thereby transfer these satellites to the orbits capable of observing the disaster-stricken area are arithmetically determined on the basis of the orbital elements of all the satellites, the current positions thereof and the geographical position of the area destined for observation.

Further, on the basis of the information available from the agency resident in the disaster-stricken area or by deciding the statuses in that area, the number of the satellites and the satellite constellation required for the current emergency operation (i.e., the high-frequency observation operation mode) are determined, which is then followed by determination of the procedure for realizing the satellite constellation within a possible shortest time. Subsequently, at every time point at which the relevant satellites become visible from the observation satellite operating ground system, commands for the orbit transfer and the observation of the area where disaster is occurring are sent sequentially to the selected satellites.

When it is decided in the observation command facility that the emergency satellite operation (i.e., high-frequency observation operation mode) has been completed, the command for transferring the satellites back to the original orbits, respectively, as well as the command for the steady observation operation mode are sent sequentially to the relevant satellites from the observation satellite operating ground system in response to the command issued from the observation command facility at every time points at which these satellites become visible from the observation satellite operating ground system.

As a modification of the embodiment of the invention described above, the observation frequency in the steady observation operation mode may be determined arithmetically in accordance with the undermentioned method as well.

In the case of the polar orbit having the inclination of ca. 90 degrees, the swath widths for observation overlap several times at the polar area, whereas in the vicinity of the earth equator, the degree of overlap of the swath widths is small. Accordingly, in order to observe completely all the regions of the earth within a certain predetermined time period (being understood that some district can not be observed although it depends on the swath width of the sensor), the observation frequency should preferably be evaluated on the basis of the overlap of the swath widths in the vicinity of the earth equator.

In this conjunction, the number x of the observation satellites required for satisfying the observation interval t (hrs) can be given by the following expression (6). (For more particulars, reference should be made to "ISTS (International Symposium on Space Technology and Science) 94-1-04).

$$x = 1/(2 \times (W-d) \times 3600) \times (p/t) \quad (6)$$

where
- l represents the length of the earth equator,
- p represents the orbital period (sec.),
- W represents the swath width (km), and
- d represents the side-lap margin of the orbit.

In the above expression, the term "$1/(2 \times (W-d) \times 3600)$" represents the number of satellites required at the least for realizing the coverage over the earth equator during one orbital revolution, wherein numeral "2" of the denominator represents that the transit across the earth equator takes place twice during one revolution. Further, "p/t" represents the ratio between the orbital period and the interval time period. A product of these two factors represents the number x of satellites required for covering the whole earth area during a given interval time. However, the satellite constellation to this end is not arbitrary but the satellites have to be constellated uniformly on the celestial sphere so that the earth as a whole can be covered with high efficiency.

In this conjunction, it is assumed that the swath width of the sensor at the altitude of 553 km in the earth observation system according to the instant embodiment of the invention is 75 km (the case of "SAR" of the JERS-1) Then, since the number x of the satellites is 24, the observation interval for the observation sensor can be determined to be once for twenty-two hours in accordance with the expression (6).

As can now be appreciated from the above description, with the earth observation system according to the instant embodiment of the invention, the frequency of observation for a particular district or given area can be enhanced from once for 22 hours to once for one hour owing to the orbit transfer from the sun-synchronized quasi-recurrent orbit to the sun-synchronized recurrent orbit.

Needless to say, upon completion of the high-frequency observation for the particular district, the observation orbit can be transferred to the sun-synchronized quasi-recurrent orbit for carrying out the steady observation. Furthermore, the frequency of observation can be realized within a wide range of values by selecting appropriately the number of satellites.

As is apparent from the foregoing, with the whole earth (environment/disaster) monitoring system according to the illustrated embodiments of the present invention, the environment monitoring of the earth over the whole surface thereof can be carried out at a predetermined frequency in the steady observation operation mode, while the observation of a district such as a disaster area can be performed in the high-frequency observation operation mode at a significantly increased frequency.

Besides, by establishing the observation orbits for the observation in the steady observation operation mode and for the observation in the high-frequency observation operation mode in proximity to each other, the amount of propellant required for the orbit transfer can be decreased.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

In describing the concept of the present invention in more general terms, it can be stated that in the steady observation operation mode for observing globally the earth, M observation satellites are constellated on each of L sun-synchronized quasi-recurrent orbits each having a same altitude and a same inclination (where L and M represents natural numbers), while in the high-frequency observation operation mode for observing a particular district on the earth, M satellites are constellated on each of L sun-synchronized recurrent orbits each having a nominal altitude of 561 km and a nominal inclination 97.6 degrees or alternatively a nominal altitude of 888.3 km and a nominal inclination of 98.8. Furthermore, programs executed by a computer for carrying out the invention may fall within the purview of the present invention as well.

Accordingly, all suitable modifications and equivalents may be resorted to, falling within the spirit and scope of the invention.

What is claimed is:

1. An earth observation system, comprising:
   a plurality of observation satellites each equipped with orbit transfer means; and
   an observation satellite operating ground system for performing control for maintaining orbits for said observation satellites, respectively, or for changing orbits for said observation satellites;
   wherein in a steady observation operation mode, said observation satellites are operated on a plurality of quasi-recurrent orbits, respectively, for performing observation of the earth,
   wherein when a high-frequency observation operation mode where observation for a particular district on the earth is carried out at an increased frequency is required, appropriate ones of said observation satellites are transferred to recurrent orbits so that said particular district can be observed with said transferred observation satellites at an increased frequency, and
   wherein when said high-frequency observation operation mode becomes no more necessary, said satellites transferred to said recurrent orbits are again transferred back to the original quasi-recurrent orbits, respectively.

2. An earth observation system according to claim 1, wherein in the steady observation operation mode, said plurality of observation satellites are constellated for operation on a plurality of sun-synchronized quasi-recurrent orbits, respectively, which have a same altitude and a same inclination and which differ from one another in respect to right ascension of ascending node, while in said high-frequency observation operation mode, said appropriate observation satellites are transferred, respectively, to a plurality of sun-synchronized recurrent orbits each having a nominal altitude of 561 km and a nominal inclination of 97.6 degrees or alternatively to a plurality of sun-synchronized recurrent orbits each having a nominal altitude of 888.3 km and a nominal inclination of 98.9 degrees, to thereby operate all of said observation satellites transferred to said sun-synchronized recurrent orbits with the constellation such that said particular district on the earth can be observed with all of said orbit-transferred observation satellites.

3. An earth observation system according to claim 1, each of said observation satellites being equipped with an earth observation sensor,
   wherein with regard to the operational orbits of said observation satellites in said steady observation operation mode, values of altitude and inclination of said operational orbits are, respectively, in proximity to values of altitude and inclination of the observation orbits in said high-frequency observation operation mode for observing a particular district on the earth, and
   wherein said observation sensor has an appropriate swath width so that global observation of the whole earth can be carried out within a number of days of a recurring period or within a number of revolutions in a recurring period in said steady observation operation mode.

4. A system in accordance with claim 1, wherein said observation satellites comprise:
   communication means for receiving a control command concerning an orbit transfer quantity as sent from an observation satellite operating ground system;
   data processing means for arithmetically determining control quantities; and
   control means for controlling attitude of said observation satellite and an orbit thereof,
   whereby orbital elements of a sun-synchronized quasi-recurrent orbit or alternatively those of a sun-synchronized recurrent orbit can be maintained during a period demanded.

5. A system in accordance with claim 1, wherein said observation satellites comprise:
   an observation sensor having an appropriate swath width;
   communication means for receiving a control command concerning an orbit transfer quantity as sent from an observation satellite operating ground system;
   data processing means for arithmetically determining control quantities; and
   control means for controlling a pointing direction of said observation sensor as well as attitude of said observation satellite and an orbit thereof,
   whereby orbital elements of a sun-synchronized quasi-recurrent orbit or alternatively those of a sun-synchronized recurrent orbit can be maintained during a period demanded.

6. A system in accordance with claim 1, wherein said observation satellites comprise:
   an observation sensor having an appropriate swath width;
   communication means for receiving a control command sent from an observation satellite operating ground system;
   data processing means for arithmetically determining control quantities; and
   control means for controlling a pointing direction of said observation sensor as well as attitude of said observation satellite and an orbit thereof,
   wherein said observation sensor can be oriented in a direction pointing to the earth for observation thereof either on a sun-synchronized quasi-recurrent orbit or on a sun-synchronized recurrent orbit with an operation command.

7. A system in accordance with claim 6, wherein orientation of said observation sensor in a direction pointing to the earth is effectuated by controlling a pointing direction of said sensor.

8. A system in accordance with claim 6, wherein orientation of said observation sensor in a direction pointing to the earth is effectuated by controlling an attitude of said observation satellite.

9. A system in accordance with claim 1, further comprising a sensor system mounted on said observation satellite for observing the earth, wherein said sensor system comprises:
   sensor means for observing the earth;
   detecting means for detecting attitude of said observation satellite;
   sensor orientation control means for controlling orientation of a sensor; and
   a data processing subsystem for arithmetically determining control quantities,
   wherein the earth can be observed with a desired accuracy by driving said sensor means through said sensor orientation control means in accordance with a control quantity command value supplied from said data processing subsystem regardless whether said observation satellite is on a sun-synchronized quasi-recurrent orbit or on a sun-synchronized recurrent orbit or in the course of being transferred from one of said orbits to the other.

10. A system in accordance with claim 1, wherein said observation satellite operating ground system comprises:

a transmission/reception subsystem for receiving a telemetry signal carrying data indicating states of said observation satellite and a ranging signal for measuring a range to said satellite from a ground station while transmitting satellite control commands;

a ranging subsystem for processing said ranging signal to thereby determine arithmetically the range from the ground to the satellite and a range rate;

an orbit determination program module for arithmetically determining six elements of the orbit of said observation satellite on the basis of said range and said range rate; and a satellite control command generation program module for arithmetically determining control quantities for the orbit and attitude of said observation satellite, wherein orbit control quantities for the orbit of at least one observation satellite operating currently and for orbital transfer of said observation satellite to an orbit as required are arithmetically determined, to thereby generate control commands for said control quantities for transmission to said observation satellite.

11. A system in accordance with claim 1, further comprising an observation data receiving system for receiving data acquired through observation by at least one of said observation satellites, said observation data receiving system comprising:

signal receiving means for receiving data of observation transmitted from at least one of said observation satellites operating currently;

recording means for recording said observation data;

means for generating an antenna control command for controlling a pointing direction of an antenna of said observation data receiving system on the basis of power level of a received signal derived from output of said signal receiving means; and driving means for driving an antenna control actuator in accordance with said antenna control command.

12. An earth observation method of performing control for maintaining orbits of a plurality of observation satellites each equipped with orbit transfer means, comprising the steps of:

operating said observation satellites on a plurality of quasi-recurrent orbits, respectively, for performing observation of the earth in a steady observation operation mode;

transferring appropriate ones of said observation satellites to recurrent orbits so that a particular district can be observed with said transferred observation satellites in a high-frequency observation operation mode where observation for said particular district on the earth is required to be carried out at an increased frequency; and transferring again said satellites transferred to said recurrent orbits back to the original quasi-recurrent orbits, respectively, when said high-frequency observation operation mode becomes no more necessary.

13. An earth observation method according to claim 12, wherein in the steady observation operation mode, said plurality of observation satellites are constellated for operation on a plurality of sun-synchronized quasi-recurrent orbits, respectively, which have a same altitude and a same inclination and which differ from one another in respect to right ascension of ascending node, while in said high-frequency observation operation mode, all of said appropriate observation satellites transferred, respectively, to a plurality of sun-synchronized recurrent orbits each having a nominal altitude of 561 km and a nominal inclination of 97.6 degrees or alternatively to a plurality of sun-synchronized recurrent orbits each having a nominal altitude of 888.3 km and a nominal inclination of 98.9 degrees are operated with the constellation such that said particular district on the earth can be observed with all of said orbit-transferred observation satellites.

14. An earth observation method according to claim 12, each of said observation satellites being equipped with an earth observation sensor, said method comprising:

a step in which with regard to the operational orbits of said observation satellites in said steady observation operation mode, values of altitude and inclination of said operational orbits are set, respectively, in proximity to values of altitude and inclination of the observation orbits in said high-frequency observation operation mode for observing a particular district on the earth, and a step in which said observation sensor has an appropriate swath width so that global observation of the whole earth can be carried out within a number of days of a recurring period or within a number of revolutions in a recurring period in said steady observation operation mode.

15. An path observation program to be mounted on a computer to control for maintaining orbits of a plurality of observation satellites each equipped with orbit transfer means, comprising the steps of:

operating said observation satellites on a plurality of quasi-recurrent orbits, respectively, for performing observation of the earth in a steady observation operation mode;

transferring appropriate ones of said observation satellites to recurrent orbits so that a particular district can be observed with said transferred observation satellites in a high-frequency observation operation mode where observation for said particular district on the earth is required to be carried out at an increased frequency; and transferring again said satellites transferred to said recurrent orbits back to the original quasi-recurrent orbits, respectively, when said high-frequency observation operation mode becomes no more necessary.

* * * * *